United States Patent Office 3,547,918
Patented Dec. 15, 1970

3,547,918
PROCESS FOR THE PREPARATION OF
TRIGLYCIDYL ISOCYANURATE
Daniel Porret, Binningen, Karl Metzger, Aesch, and Alfred Heer, Basel, Switzerland, assignors to Ciba Limited, Basel, Switzerland, a company of Switzerland
No Drawing. Filed June 11, 1968, Ser. No. 735,996
Claims priority, application Switzerland, June 13, 1967, 8,371/67
Int. Cl. C07d 55/38
U.S. Cl. 260—248                    13 Claims

ABSTRACT OF THE DISCLOSURE

A process for the production of triglycidyl isocyanurate by condensation of cyanuric acid with epichlorohydrin in the presence of a tertiary amine, a quaternary ammonium base or a quaternary ammonium salt as catalyst, the epichlorohydrin being used at a rate of at least 2 mols and at most 10 mols per 1 equivalent of active H atom of the cyanuric acid to form the corresponding mono- di- or tri-(3-chloro-2-hydroxypropyl)- -isocyanurate, and the tri-(3-chloro-2-hydroxypropyl) isocyanurate formed being subsequently converted into triglycidyl isocyanurate by removal of hydrogen halide, characterized in that in a first stage, at a temperature of over 60° C. to at most 165° C. the cyanuric acid is converted practically quantitatively into tri-(3-chloro-2-hydroxypropyl)-isocyanurate by an additive reaction with epichlorohydrin, and a part of the initially formed 3-chloro-2-hydroxypropyl groups are further transepoxidized with the excess epichlorohydrin to glycidyl groups and an equivalent proportion of epichlorohydrin adds on the hydrogen chloride eliminated from the 3-chloro-2-hydroxypropyl groups and is converted into glycerin dichlorohydrin; after the end point of the practically quantitative addition with epichlorohydrin is reached, the reaction is discontinued and immediately thereafter the 3-chloro-2-hydroxypropyl-isocyanurate left in the reaction mixture and the glycerin dichlorohydrin formed are dehydrohalogenated to triglycidyl-isocyanurate and epichlorohydrin respectively by treatment with a 5 to 40% stoichiometric excess of concentrated aqueous alkali hydroxide solution, the alkali solution being added in portions, and at the same time the water added in form of the alkali solution and the water of reaction formed are distilled off as an azeotrope with epichlorohydrin at the same rate as they are added and formed respectively; after all the alkali needed has been added, the reaction is discontinued and finally, in working-up, the catalyst is washed out of the reaction mixture obtained or extracted from the crude triglycidyl-isocyanurate.

The manufacture of polyglycidyl derivatives of cyanuric acid in a two-stage process is known from U.S.A. specification 2,809,942. In the first stage of the process cyanuric acid is reacted at an elevated temperature with epichlorohydrin in the presence of an organic base, such as teritary amine or a quaternary ammonium compound, to form a polychlorohydrin derivative of cyanuric acid; in the second process step the polychlorohydrin derivative is converted into the polyglycidyl derivative with a solid or aqueous strong alkali (sodium hydroxide or sodium hydroxide solution) at an elevated temperature. Later investigations have shown (compare British specification 996,723, page 1, lines 73–79) that the glycidyl derivatives produced according to U.S.A. specification 2,809,942 contain glycidyl esters of isocyanuric acid. It has also been found that in the process of U.S.A. specification 2,809,942 a certain amount of glycidyl compounds is formed during the first stage depending on the excess of epichlorohydrin used (compare German Auslegeschrift 1,211,650, column 4, lines 32–36).

Using the method described in the examples of U.S.A. specification 2,809,942 products are obtained with a relatively high chlorine content and a low epoxide content, which also contain considerable amounts of halohydrin esters as well as mono- and diglycidyl isocyanurate apart from the triglycidyl isocyanurate. The resultant product has poor keeping qualities and therefore technical suitability the trigylcidyl isocyanurate produced must fulfill the following conditions:

(1) It must be free from the basic catalyst used during production;

(2) It must contain a minimum of H-active compounds, since even a small amount of mono- or digylcidyl isocyanurate impairs the keeping qualities considerably.

There have been a large number of proposals regarding methods for the production of a substantially pure triglycidyl isocyanurate free from catalyst. The methods so far proposed fail as the resultant yield is too low, or because the procedure is too complicated, making the final product uneconomical.

For instance: Example 11 of U.S.A. specification 2,809,942 proposes as a variant of the process to use as catalyst a high-molecular, insoluble ion exchange resin containing quaternary ammonium chloride groups, that can easily be filtered off from the reaction mixture, in place of the soluble tertiary amines and low-molecular quaternary ammonium compounds. This method yields a product containing 7.75 of epoxide equivalents/kg. (77% of the theoretical yield) and still 7.8% of chlorine and is therefore technically unsuitable.

German specification 1,180,373 describes a one-step process for the manufacture of glycidyl-containing products by reacting cyanuric acid with excess epichlorohydrin (up to 120 mols of epichlorohydrin per mol of cyanuric acid) without a catalyst. This process requires the use of a large amount of expensive epichlorohydrin as the hydrogen halide acceptor and which must afterwards be liberated from the glycerin dichlorohydrin formed. The time required and the low yield make this process uneconomical. According to Example 1 the mixture must be refluxed with stirring for 19 hours. The products contain at most 7.0 epoxide equivalents/kg. (11.2% of epoxide oxygen), while it must be taken into consideration that the theoretical epoxide equivalent of diglycidyl isocyanurate is already 8.29 epoxide equivalents/kg. The product also contains 8.1% of chlorine necessitating purification so that it cannot compete with commercially available epoxy resins. British specification 996,723 and the corresponding French specification 1,387,177 recommend purification of the crude product obtained by the above-mentioned process by crystallization from methanol.

The process of German Auslegeschrift 1,216,315 requires an excess of epichlorohydrin about as large as the one used in the process of German specification 1,180,373. The resultant crude product must be purified by crystallization from ether or alcohol. The product obtained by this process contains after recrystallization 9.07 epoxide equivalents/kg. and still 1.8% of chlorine. This German Auslegeschrift advises the expert against the use of a two-stage process, when the first step consists in the addition of epichlorohydrin in the presence of a catalyst and the production of the epoxy compound with alkali in the second step, with the following words (column 1, lines 14–30, loc. cit.):

"The production of epoxy compounds with alkali cannot be carried out completely in one stage, as is shown by the high chlorine content and the low epoxide content of the polyglycidyl cyanurate formed. Two or three treatments with alkali have to be carried out in this known process, which is complicated and of course uneconomical. Polymeric compounds that have a low epoxide content are produced by the reaction of unreacted NH-groups of the cyanuric acid with the glycidyl groups already formed. The production of practically pure monomeric glycidyl isocyanurate by this process is therefore not feasible."

A multi-stage process is described in German Auslegeschrift 1,220,859 where in the first step epichlorohydrin is added on in the presence of very special catalysts, namely thioethers and/or their sulphonium salts and where the hydrogen halide is removed from the reaction product by repeated treatment with alkali. The only example quoted in the German Auslegeschrift 1,220,859 still requires a large excess of epichlorohydrin (45 mols of epichlorohydrin per mol of cyanuric acid) in the first step. The crude product is obtained in good yield with a content of 8.13 epoxide equivalents/kg. and a chlorine content of 1.9% and must be freed from resinous components by crystallization from organic solvents, such as methanol. The expert is clearly told in this Auslegeschrift that quaternary ammonium compounds are not suitable as catalysts for the production of pure triglycidyl isocyanurate from cyanuric acid and epichlorohydrin. It states there verbatim (column 1, lines 6–13, loc. cit.):

"It is known that quaternary ammonium salts promote polymerization of epihalohydrins and consequently epoxy compounds with a high chlorine content are obtained from this process. Even repeated treatment with sodium hydroxide solution does not yield a chlorine-free monomeric glycidyl compound of cyanuric acid by this process (compare U.S.A. specification 2,809,942)."

This prejudice of the expert was not entirely unfounded, as even in Example 14 of U.S.A. specification 2,809,942, giving the best epoxide yield, four treatments for the removal of hydrogen halides are required to give a product with a maximum epoxide content of 8.33 (diglycidyl isocyanurate has for comparison 8.29) epoxide equivalents/kg. and a chlorine content of 0.68%.

A process is described in German Auslegeschrift 1,211,650 to obtain the maximum yield of crystalline triglycidyl isocyanurate using the minimum excess of expensive epichlorohydrin and consisting in the following steps:

(a) A mixture of cyanuric acid and epichlorohydrin in molecular proportion 1:3 to about 1:15 with addition of at least 50% of the non-crystallizable share of a previous mixture are heated to between 70 to 200° C.;

(b) Hydrogen chloride is removed from the chlorohydrin ester obtained by an alkaline compound at the lowest temperature possible and while keeping the pH-value of the reaction mixture below about 13;

(c) The reaction mixture is mixed with methanol, glycol monomethyl ether or glycolmonoethyl ether, after removal of most of the epichlorohydrin excess and any solvents other than methanol;

(d) The crystallizable share is separated and at least 50% of the non-crystallizable part is added to step (a), the rest possibly to step (b) of the next batch.

The mother liquor of previous batches is recycled in this process, similarly to the above-mentioned British specification 996,723, so that it is impossible to gauge the yield. Furthermore as in British specification 996,723 the use of relatively expensive organic solvents is essential for the crystallization. A low reaction temperature of under 50° C., as a rule 20–30° C., is required to obtain good yields from the HCl-cleavage by strong alkali, such as sodium hydroxide solution; the removal of hydrogen halide takes place very slowly and leads to undesirably long reaction times.

Surprisingly, a considerably simpler and cheaper process has been discovered, using tertiary amines and quaternary ammonium salts as catalysts and giving high yields of triglycidyl isocyanurate with a high epoxide and low chlorine content. Scale deposit on the reactor is small and consequently losses of epichlorohydrin are minimal.

In the process of the present invention, the first step consists in reacting the cyanuric acid in the known manner in the presence of a nitrogen-containing catalyst with a stoichiometric excess of at least 2 mols and at most 10 mols of epichlorohydrin per 1 equivalent of active H-atom of cyanuric acid. The following successive catalyzed reactions occur in this first step of the process:

(1) Formation of the chlorohydrin isocyanuric acid compound according to the reaction equation:

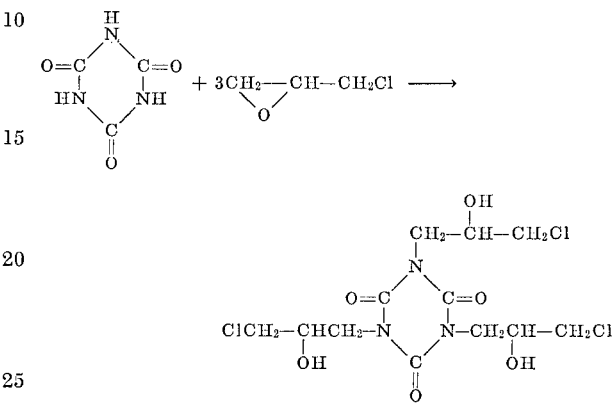

The primary formation of the chlorohydrin compound according to reaction Equation 1 is practically irreversible;

(2) "Transepoxidation" according to the reaction equation.

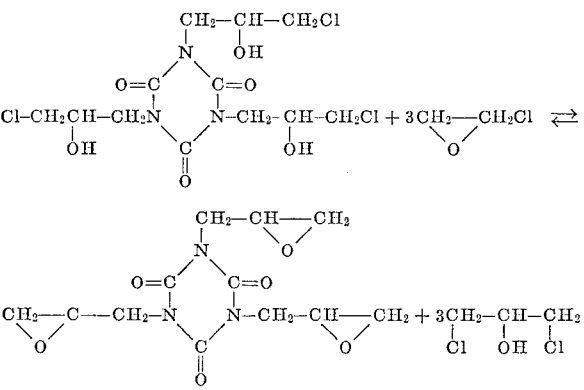

This transepoxidation is a chemical equilibrium reaction. As the equilibrium concentration of the triglycidyl isocyanurate depends on the concentration of unreacted epichlorohydrin in the reaction mixture in chemical equilibrium, it is possible to shift the equilibrium the more in favour of triglycidyl isocyanurate the higher the excess of epichlorohydrin used. The reaction of the cyanuric acid according to reaction Equation 1 should take place quantitatively using the newly proposed process, but it is not necessary to reach the transepoxidation equilibrium according to reaction 2. It is important for the suppression of side reactions that the first step is terminated as soon as the end point for the quantitative adding on of epichlorohydrin according to reaction Equation 1 has been reached.

The second step of the process of the present invention takes place immediately. It consists in adding small portions of concentrated aqueous alkali metal hydroxide solution to the reaction mixture obtained and simultaneously distilling off the azeotrope of water with epichlorhydrin. Care must be taken that amounts of water added as alkali metal hydroxide solution and water formed in the reaction and the water distilled off as the azeotrope are approximately equal within the same time period. In other words, the speed of addition of the alkali hydroxide solution has an upper limit depending on the speed of the simultaneous distillation of water. The removal of hydrogen halide may take place within the boiling range of the reaction mixture under atmospheric pressure, but preferably at lower temperatures in vacuo.

The amount of alkali used must be sufficient not only to convert the chlorohydrin isocyanurate present in the reaction mixture quantitatively into glycidyl isocyanurate but also to convert the glycerin chlorohydrin formed quantitatively back to epichlorohydrin. The stoichiometrically required quantity of alkali is therefore independent of the concentrations of glycidyl isocyanurate, chlorohydrin ester, epichlorohydrin and glycerin chlorohydrin and is equal to the amount of alkali equivalent to the amount of cyanuric acid used as starting material. To obtain a good yield of triglycidyl isocyanurate the alkali solution must be used in a stoichiometrical excess of 5 to 40%. The reaction must be immediately terminated as soon as the required amount of alkali hydroxide solution has been added and the simultaneous azeotropic removal of water has been completed. The catalyst must be removed in the subsequent working-up of the reaction mixture, as it would influence the keeping qualities of the product unfavourably. The presence of the catalyst has surprisingly no adverse effect on the yield of triglycidyl isocyanurate during the various stages of the new process, which is remarkably close to the theoretical yield. The expert could not expect such high yields of over 90% of the theoretical epoxide content according to the teachings of the German Auslegeschrift 1,220,859, as this ascribes a polymerizing action and an increase of the chlorine content to the presence of nitrogenous bases added during the reaction. Surprisingly this does not happen, when all conditions of the process of the present invention are observed.

The object of the present invention is a process for the manufacture of triglycidyl isocyanurate by condensation of cyanuric acid with epichlorohydrin in the presence of a tertiary amine, a quaternary ammonium base or a quaternary ammonium salt as catalyst. This is carried out by reacting epichlorohydrin in an amount of at least 2 mols and at most 10 mols per 1 equivalent of active H-atom or cyanuric acid, whereby the corresponding mono-, di- or tri-(3-chloro-2-hydroxypropyl) isocyanurate is formed, and by subsequent removal of hydrogen halide from tri-(3-chloro-2-hydroxypropyl) isocyanurate to yield triglycidyl isocyanurate. The present process is characterized in that in a first stage, at a temperature of over 60° C. to at most 165° C. the cyanuric acid is converted practically quantitatively into tri-(3-chloro-2-hydroxypropyl) isocyanurate by an additive reaction with epichlorohydrin, whereby a part of the initially formed 3-chloro-2-hydroxypropyl groups are further transepoxidized with the excess epichlorohydrin to glycidyl groups and an equivalent proportion of epichlorohydrin adds on the hydrogen chloride eliminated from the 3-chloro-2-hydroxylpropyl groups and is converted into glycerin dichlorohydrin; after the end point of the practically quantitative addition with epichlorohydrin is reached the reaction is discontinued and immediately thereafter the 3-chloro-2-hydroxypropyl-isocyanurate left in the reaction mixture and the glycerin dichlorohydrin formed are dehydrohalogenated to triglycidyl isocyanurate and epichlorohydrin respectively by treatment with a 5 to 40% stoichiometric excess of concentrated aqueous alkali hydroxide solution, the alkali solution being added in portions, and at the same time the water added in form of the alkali solution and the water of reaction formed being distilled off as an azeotrope with epichlorohydrin at the same rate as it is added or formed respectively; after all the alkali needed has been added the reaction is discontinued and finally, in working-up the catalyst is washed out of the reaction mixture obtained or extracted from the crude triglycidyl-isocyanurate.

The adding on of epichlorohydrin and the transepoxidation, that is the first step of the process, are suitably carried out in the temperature range of 70–150° C. and preferably between 90–100° C.

The epichlorohydrin is used in a stoichiometric excess, that is at least 2 mols and at most 10 mols of epichlorohydrin are used per 1 equivalent of active H-atom of cyanuric acid. The preferred quantity is 3 to 6 mols of epichlorohydrin per equivalent active H-atoms of cyanuric acid.

Both these steps of the process of the present invention are carried out in the presence of tertiary amines, quaternary ammonium bases or quaternary ammonium salts as catalysts.

The most suitable catalysts are compounds readily soluble in the reaction medium for instance low-molecular tertiary amines, such as triethylamine, tri-n-propylamine, benzyldimethylamine, triethanolamine; quaternary ammonium bases such as tetramethyl ammonium hydroxide, benzyl trimethyl ammonium hydroxide and quaternary ammonium salts such as benzyl trimethyl ammonium chloride, benzyl trimethyl ammonium acetate, methyl triethyl ammonium chloride; particularly good results are obtained as a rule by the use of tetramethyl ammonium chloride as the catalyst.

The catalyst is mostly used at a concentration of 0.01–5% by weight, preferentially at 0.05 to 1% by weight, with respect to the total weight of the components of the reaction mixture. The catalyst is added as a concentrated (for instance a 50%) aqueous solution. A small amount of water acts as proton donor in the reaction mixture and fulfills as such the role of a co-catalyst.

As mentioned before, the first step of the process should be terminated as soon as the end-point for the quantitative addition of epichlorohydrin has been reached. Otherwise side reactions occur, which could reduce the yield. It is therefore very important to determine the end-point of the addition. This end-point can be approximately determined analytically by the decrease of the epoxide content in the reaction mixture.

This method for the determination of the end-point is, however, not sufficiently accurate for all purposes. The difference of the epoxide groups in the reaction mixture determined analytically represents the difference of two large numbers when using an excess of epichlorohydrin. The result is therefore subject to large scatter errors.

Measurement of the pH value with a pH electrode permits direct observation of the progress of the reaction during addition. The pH value of the reaction mixture changes due to the disappearance of acid groups in a manner similar to a titration and an analogous rapid rise of pH can be observed. This effect is not very pronounced in the case of cyanuric acid, as it is a weak acid and is only sparingly soluble.

It has been shown in practice that optimum results may be obtained by allowing the reaction to continue for a period equal to that required to reach the rapid rise of the pH-value before commencing the removal of the hydrogen halide.

Concentrated aqueous solutions of strong alkalis such as concentrated aqueous solutions of sodium hydroxide or potassium hydroxide, are used for this removal of the hydrogen halide. The concentration of the alkali solution is generally about 40–60% w/w. The alkali is used in a 5 to 40% stoichiometric excess calculated with respect to equivalents of active hydrogen of the cyanuric acid, the preferred stoichiometric excess being 15–25%.

The alkali solution must be added in small portions or drop by drop, while at the same time the water added and the water formed in the reaction are distilled off as an azeotropic mixture with epichlorohydrin. The rate of addition depends on the rate of distillation of water out of the reaction mixture. The reaction temperature of the second step of the process corresponds to the boiling interval for the azeotropic distillation of water and epichlorohydrin and lies generally between 100–115° C., mostly between 100–105° C., when working at atmospheric pressure.

As mentioned before, the removal of hydrogen halide is preferentially carried out in vacuo at lower temperatures, as a rule between 50–80° C. A preferred temperature for the removal of hydrogen halide is about 60° C.; the removal of hydrogen halide is started under a vacuum of about 150 mm. Hg and the pressure is gradually reduced to 100 mm. Hg during the course of the reaction. This mode of operation ensures that sufficient water is retained in the reaction mixture.

A further improvement in the yield may be obtained during the removal of hydrogen halide by additions of some more catalyst before or during the removal of hydrogen halide.

The further additions of catalyst after the termination of the adding-on reaction causes a more rapid and more complete removal of hydrogen halide.

The reaction must be terminated as a rule immediately after all the alkali solution has been added by cooling or additions of water. Longer reaction times increase the chlorine content of the end-product and reduce the yield of epoxide.

The subsequent working-up of the reaction product may be carried out in a number of ways, however in each case the removal of the catalyst is essential to obtain stable end products with a high epoxide content.

For example, the solid sodium chloride is removed by some known process, such as filtration or centrifugation after cooling; the filter cake is thoroughly washed with epichlorohydrin and the excess and the epichlorohydrin regenerated from glycerin chlorohydrin is distilled off, in general in vacuo. The resultant crude product, which still contains the catalyst, is recrystallized from a suitable polar solvent such as methanol. The catalyst then remains dissolved in the polar solvent or in the extraction medium. This method of operation is specially chosen when the crude product is of unsatisfactory quality and by-products have to be removed. A considerable loss in yield must be expected in this case.

The yield-reducing recrystallization need not be carried out, if the crude product is obtained in a sufficiently pure state and only the catalyst need be washed out. The reacted reaction mixture is mixed with water without previous distillation of epichlorohydrin, the separated sodium chloride is dissolved with thorough stirring, the aqueous phase separated in a separating funnel and the organic fraction is washed for neutralisation with saturated sodium dihydrogen phosphate solution and with water. The reaction mixture is washed with a 2.5% solution of sodium hydroxide before neutralisation, if the mixture is strongly discoloured. The epichlorohydrin used as solvent for washing is then distilled off in vacuo, whereupon the triglycidyl isocyanurate is precipitated as a resinous residue, which readily crystallizes.

The triglycidyl isocyanurate can be cured with the usual curing agents for epoxy resins, for instance polycarboxylic acid anhydrides, such as phthalic acid anhydride, or polyamines such as diethylenetriamine, yielding infusible and insoluble products suitable for many applications in industry and technology. Curable mixtures of such polyglycidyl esters and curing agents and possibly suitable additives, such as active thinners, plasticisers, pigments, extenders and fillers may be used as coatings, lacquers, dipping resins, casting resins, laminating resins, moulding materials, potting and encapsulating materials for insulating purposes in the electrical industry and may also be used as adhesives.

In the following examples percent means percent w./w.

EXAMPLE 1

The apparatus consists of a reaction flask, equipped with stirrer, thermometer, dropping funnel and a water separator which returns the denser solvent (epichlorohydrin) into the reaction flask and on top of this a high efficiency condenser. The apparatus is so set up that it can be used under vacuum. It is advantageous to connect in series a large flask to act as air reservoir to avoid variations in pressure.

129 grams of pure cyanuric acid (1 mol=3 equivalents of active hydrogen atoms) are mixed with stirring in the reaction flask of the above-mentioned apparatus with 1390 g. (15 mols; equivalent ratio 1:5) of epichlorohydrin and 80 ml. of water and warmed to 90° C. 1.2 grams of tetramethyl ammonium chloride are added as the catalyst at this temperature. The suspension begins to clear slowly after reacting for one hour between 93 and 95° C. A pH-electrode is inserted and indicates a pH-value of 5.9. The pH-value rises to 7.2 within 17 minutes. The electrode is then removed, a dropping funnel with 288 g. (3.6 mols= 20% excess) of 50% aqueous sodium hydroxide solution is put on and a further 1.2 g. of catalyst are added. A vacuum is applied to the apparatus, when the epichlorohydrin begins to distill from the reaction mixture as an azetrope with water. The sodium hydroxide solution is added dropwise at a constant internal temperature of 60° C., corresponding to an initial pressure of 140 to 150 mm. Hg, while the water added and the water formed is azeotropically distilled off with epichlorohydrin. The rate of addition is so adjusted that the reaction time is about 80 minutes. The epichlorohydrin freed from water is continuously returned to the reaction mixture. The vacuum must be slowly increased during the addition of the sodium hydroxide solution and reaches 90–100 mm. Hg at the end of the reaction. About 250 ml. of water are separated.

The vacuum is released for working-up, the reaction mixture is cooled, 1 litre of water is added, the precipitated sodium chloride is dissolved with stirring and the aqueous phase is separated in a separating funnel. The organic phase is washed once with 200 ml. of saturated sodium dihydrogen phosphate solution and once with the same quantity of water. Epichlorohydrin is distilled off in a rotary evaporator on a water-jet pump and the residue is dried for 20 minutes at 90° C. under a high vacuum.

222 grams of a light resin with crystalline particles are obtained consisting essentially of triglycidyl isocyanurate. The mass crystallizes completely after one hour. The yield is 75% of the theoretical, the epoxide content is 9.64 epoxide equivalent/kg.=95.4% of the theoretical, the chlorine content is 1.1%.

EXAMPLE 2

129 grams of commercial cyanuric acid (1 mol) are warmed to 90° C. with 1390 g. of commercial epichlorohydrin (15 mols: equivalent ratio 1:5) in the apparatus described above. 7.5 ml. of 0.1 N sodium hydroxide and 7.5 g. of a 50% aqueous solution of tetramethyl ammonium chloride are added to the mixture at that temperature. A weakly exothermic reaction sets in and the mixture is cooled slightly to keep the temperature below 95° C. The pH-value drops initially but rises later on. A weak but distinct rise in the pH-value is observed after 55 minutes. The reaction is allowed to continue for a further 55 minutes between 90 to 92° C. The reaction mixture does not clear completely. The pH-electrode is removed, a dropping funnel containing 264 g. (3.3 mols=10% excess) of a 50% aqueous sodium hydroxide solution is put on and a further 5 g. of aqueous 50% tetramethyl ammonium chloride solution are added to the reaction mixture. A vacuum is applied to the apparatus, whereupon the epichlorohydrin begins to distill off from the reaction mixture as an azetrope with water. The sodium hydroxide solution is added dropwise at a constant internal temperature of 60° C., corresponding to an initial pressure of 140–150 mm. Hg, while the added water and the formed water are distilled off azetropically with epichlorohydrin. The addition rate is so adjusted that the reaction takes about 90 minutes. The epichlorohydrin freed from water is continuously returned to the reaction mixture. The vacuum must be increased during the addition of the sodium hydroxide solution and the pressure drops to 90–100 mm. Hg towards the end of the reaction. About 210 ml. of water are separated.

The apparatus is aerated for working-up, the reaction mixture is cooled and divided into two halves.

The first half is thoroughly stirred with 400 ml. of water, the precipitated sodium chloride is dissolved and the aqueous phase separated in a separating funnel. The organic phase is washed with 100 ml. in each case of 3% sodium hydroxide solution, saturated sodium dihydrogen phosphate solution and water. The epichlorohydrin used as the solvent is distilled off in a rotary evaporator under a water-jet pump and the residue is dried at 100° C. for 30 minutes under a high vacuum. 104 grams of a light, rapidly crystallizing substance are obtained, consisting essentially of triglycidyl isocyanurate. The yield is 70% of the theoretical. The substance contains 9.51 epoxide equivalents/kg. (theoretical 10.1) and still 0.5% chlorine.

The second half is filtered with a filter aid (Celite), the filter cake is thoroughly washed with two portions of epichlorohydrin and the filtrate concentrated in a rotary evaporator. The crude product is dried at 100° C. for 15 minutes under a high vacuum. The residue (138 g.=93% of theoretical; 8.57 epoxide equivalents/kg. and 1.6% chlorine) is dissolved in 138 g. of ethanol with warming to 60° C. and allowed to crystallize at 5° C. The crystals are filtered off, washed twice wtih a little cooled alcohol and dried for 3 hours in a vacuum drying chamber at 50° C. 102 grams of triglycidyl isocyanurate (=69% of theoretical) are obtained containing 9.37 epoxide equivalents/kg. and still 0.8% chlorine.

EXAMPLE 3

A batch analogous to Example 2, but using 30 mols of epichlorohydrin per mol of cyanuric acid and identical concentrations of catalyst was reacted as before and yielded after washing 236 g.—corresponding to 79.5% of the theoretical—of triglycidyl isocyanurate containing 9.49 epoxide equivalents/kg. and 0.9% chlorine.

EXAMPLE 4

4.515 kilograms (35 mols) of cyanuric acid and 48.56 kg. (525 mols) of epichlorohydrin are placed in a 50 litre stainless steel vessel and warmed to 90° C. 26 ml. of N-sodium hydroxide solution, 0.15 kg. of tetramethyl ammonium chloride and 0.2 kg. of water are then added to the mixture. The mixture is cooled to 50° C. after remaining at 90° C. for 5 hours and a further 0.1 kg. of tetramethylammonium chloride dissolved in 0.1 kg. of water is added. 9.27 kg. of a 50% aqueous sodium hydroxide solution are run in within a period of 2 hours and the water/epichlorohydrin azeotrope is simultaneously distilled off under a vacuum of 80 mm. Hg at 50–52° C. internal temperature. The water is continuously separated from the distillate and the epichlorohydrin is returned to the vessel. Distillation is continued for 5 more minutes after the end of the sodium hydroxide additions. The epichlorohydrin solution is washed first with 13 litres of water, then with 3 litres of a sodium dihydrogen phosphate solution and is finally extracted with 3 litres of water. The epichlorohydrin is then distilled in vacuo. The residue is poured on to metal sheets and solidifies on cooling to a white, crystalline mass. Yield: 9.05 kg. (87% of the theoretical) of white, crystalline triglycidyl isocyanurate; total chlorine content 1.1%, melting range 95–115° C., epoxide equivalent per kg.: 9.8.

We claim:

1. In the two step process for the production of triglycidyl isocyanurate wherein, in the first step, cyanuric acid is condensed with epichlorohydrin in the presence of a catalyst selected from the group consisting of a tertiary amine, quaternary ammonium base and a quaternary ammonium salt, the epichlorohydrin is used at a rate of at least 2 mols and at most 10 mols per one equivalent of active hydrogen of the cyanuric acid to form the corresponding tri-(3-chloro-2-hydroxypropyl)-isocyanurate; the improvement which in the first step comprises admixing said cyanuric acid and said epichlorohydrin, at a temperature of 60–165° and terminating the reaction after the end point for the practically quantitative addition of epichlorohydrin has been reached; and, in the second step, said tri-(3-chloro-2-hydroxypropyl)-isocyanurate is converted into triglycidyl isocyanurate by the removal of hydrogen chloride; the improvement which comprises, in said second step, dehydrohalogenating the reaction mixture from said first step immediately after termination of said first step by the addition, in portions, of a 5–40% stoichiometric excess of concentrated aqueous alkali solution and, at the same time, the water added in the form of the alkali solution and the water of reaction are distilled as an azeotrope with epichlorohydrin at the same rate as they were added and formed respectively; and after all the alkali has been added, discontinuing the reaction and eliminating the catalyst during the work-up, from the reaction product obtained.

2. A process as claimed in claim 1, characterized by adding the epihalogenohydrin in amounts of 3 to 6 mols per 1 equivalent of active hydrogen atoms of cyanuric acid.

3. A process as claimed in claim 1, characterized by the use of tetramethyl ammonium chloride as catalyst.

4. A process as claimed in claim 1, characterized by using the catalyst in a concentration of 0.05 to 1% w./w. with respect to the total weight of the components of the reaction mixture.

5. A process as claimed in claim 1, characterized by carrying out the adding on of epichlorohydrin and the transepoxidation, which constitute the first step of the process, at a temperature of 90 to 100° C.

6. A process as claimed in claim 1, characterized by continually inspecting the adding on of epichlorohydrin by measuring the pH-value of the reaction mixture.

7. A process as claimed in claim 1, characterized by adding further amounts of catalyst after the end of the first step of the process.

8. A process as claimed in claim 1, characterized by carrying out the removal of hydrogen halide with alkali (the second step of the process) within the boiling range of the reaction mixture.

9. A process as claimed in claim 1, characterized by carrying out the removal of hydrogen halide with alkali under reduced pressure at about 60° C.

10. A process as claimed in claim 1, characterized by using concentrated sodium hydroxide solution as the alkali solution.

11. A process as claimed in claim 1, characterized by using the alkali in a stoichiometric excess of 10 to 25%.

12. A process as claimed in claim 1, characterized by recycling the epichlorohydrin distilled azeotropically with water into the reaction mixture.

13. A process as claimed in claim 1, characterized by washing out the reaction mixture with water after the end of the second step of the process to remove the catalyst and by subsequently distilling the excess and regenerated epichlorohydrin.

References Cited

UNITED STATES PATENTS

| | | | |
|---|---|---|---|
| 2,809,942 | 10/1957 | Cooke | 260—248X |
| 3,300,490 | 1/1967 | Budnowski | 260—248 |
| 3,337,509 | 8/1967 | Budnowski | 260—248X |

HENRY R. JILES, Primary Examiner

J. M. FORD, Assistant Examiner